(12) United States Patent
Kanumalli et al.

(10) Patent No.: US 10,587,349 B2
(45) Date of Patent: Mar. 10, 2020

(54) FREQUENCY DOMAIN BASED DIGITAL CANCELLATION OF MODULATED SPUR INTERFERENCE IN LTE-CA TRANSCEIVERS

(71) Applicant: Intel IP Corporation, Santa Clara, CA (US)

(72) Inventors: Ram Sunil Kanumalli, Linz (AT); Andreas Mayer, Gramastetten (AT); Ahmed Elmaghraby, Neubiberg (DE); Mario Huemer, Linz (AT); Burkhard Neurauter, Linz (AT)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 15/474,243

(22) Filed: Mar. 30, 2017

(65) Prior Publication Data

US 2018/0287719 A1    Oct. 4, 2018

(51) Int. Cl.
*H04L 5/14* (2006.01)
*H04B 15/00* (2006.01)
(Continued)

(52) U.S. Cl.
CPC ............. *H04B 15/00* (2013.01); *H04B 1/123* (2013.01); *H04B 1/525* (2013.01); *H04L 5/14* (2013.01); *H04L 25/0202* (2013.01)

(58) Field of Classification Search
CPC ....... H04L 5/14; H04L 25/0202; H04B 1/525; H04B 15/00
See application file for complete search history.

(56) References Cited

U.S. PATENT DOCUMENTS

| 5,802,046 | A | * | 9/1998 | Scott | ...................... | H04J 3/0682 |
| | | | | | | 370/280 |
| 2005/0159128 | A1 | * | 7/2005 | Collins | .............. | H04B 7/18513 |
| | | | | | | 455/284 |

(Continued)

OTHER PUBLICATIONS

International Search Report dated Jun. 19, 2018 in connection with International Application PCT/US2018/019489.
(Continued)

*Primary Examiner* — Hassan A Phillips
*Assistant Examiner* — Prenell P Jones
(74) *Attorney, Agent, or Firm* — Eschweiler & Potashnik, LLC

(57) ABSTRACT

A transceiver that implements a frequency domain cancellation of a transmit (Tx)-modulated spur associated with a transceiver is disclosed. The transceiver comprises a baseband receive (Rx) path configured to propagate a receive signal in frequency domain, associated with an Rx signal path of the transceiver, forming a baseband Rx signal, wherein the baseband Rx signal comprises a wanted Rx signal and an unwanted transmit (Tx) modulated spur. The transceiver further comprises a baseband Tx path configured to propagate a Tx signal in frequency domain, associated with the Tx signal path of the transceiver, thereby forming a baseband Tx signal. In addition, the transceiver comprises a cancellation circuit coupled to the baseband Rx path, configured to receive the baseband Rx signal and the baseband Tx signal, and generate a cancellation signal based thereon, in order to cancel the unwanted Tx modulated spur from the baseband Rx signal.

25 Claims, 5 Drawing Sheets

(51) Int. Cl.
*H04B 1/525* (2015.01)
*H04L 25/02* (2006.01)
*H04B 1/12* (2006.01)

(56) References Cited

U.S. PATENT DOCUMENTS

| | | | | |
|---|---|---|---|---|
| 2009/0086864 | A1* | 4/2009 | Komninakis | H04B 1/10 375/346 |
| 2011/0007839 | A1* | 1/2011 | Tang | H03F 1/32 375/296 |
| 2011/0149714 | A1 | 6/2011 | Rimini | |
| 2011/0195673 | A1* | 8/2011 | Pratt | H04B 1/52 455/78 |
| 2014/0161159 | A1* | 6/2014 | Black | H04B 15/00 375/219 |
| 2015/0126128 | A1* | 5/2015 | Youngblood | H04B 15/00 455/63.1 |
| 2016/0056946 | A1 | 2/2016 | Moher | |
| 2016/0142078 | A1* | 5/2016 | Wang | H04L 27/0008 375/297 |
| 2016/0182271 | A1* | 6/2016 | Chance | H04L 27/2672 375/344 |
| 2017/0064773 | A1* | 3/2017 | Anderson | H04W 88/06 |
| 2017/0180160 | A1* | 6/2017 | Moorti | H04L 25/03006 |
| 2017/0201368 | A1* | 7/2017 | Hou | H04L 5/0048 |
| 2017/0346510 | A1* | 11/2017 | Chen | H04L 25/49 |
| 2019/0123885 | A1* | 4/2019 | Khandani | H04B 17/14 |

OTHER PUBLICATIONS

Gebhard Andreas, et al: "Adaptive self-interference cancelation in LTE-A Carrier Aggregation DDD direct-conversion transceivers"; Jul. 10, 2016, IEEE Sensor Array and Multichannel Signal Processing Workshop, pp. 1-5, XP032962720.
"LTE Resource Guide," Anritsu Testing the Future. 3GPP. www.us.anritsu.com. 18 pages.
Kanumalli, Ram Sunil et al. "Active Digital Cancellation of Transmitter Induced Modulated Spur Interference in 4G LTE Carrier Aggregation Transceivers." 5 pages.
"Orthogonal frequency-division multiplexing." Wikipedia. 19 pages.
"Single-carrier FDMA." Wikipedia. 3 pages.
International Preliminary Report on Patentability dated Oct. 1, 2019 in connection with International Application PCT/US2018/019489.

* cited by examiner

FREQUENCY DOMAIN BASED DIGITAL CANCELLATION OF MODULATED SPUR INTERFERENCE IN LTE-CA TRANSCEIVERS

FIELD

The present disclosure relates to the field of long term evolution (LTE) transceivers, and more specifically to an apparatus and a method for a cancellation of a transmit (Tx)-modulated spur interference in LTE transceivers.

BACKGROUND

Mobile user equipments (UEs) when operating in Frequency Division Duplex (FDD) mode may face several unpredicted issues. One of the major issues is the transmit (Tx)-modulated spur interference problem that occur in LTE-Frequency Division Duplex (FDD) transceivers. The Tx-modulated spur directly interferes with the wanted signal in LTE-FDD transceivers and causes a severe degradation to its signal-to-noise ratio (SNR). Carrier Aggregation (CA) is one of the key features in Fourth Generation (4G) Long Term Evolution-Advanced (LTE-A) mobile communication systems to meet the strong demand for the high data rates from the mobile users and the issue of Tx-modulated spur is dominant in CA scenarios.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
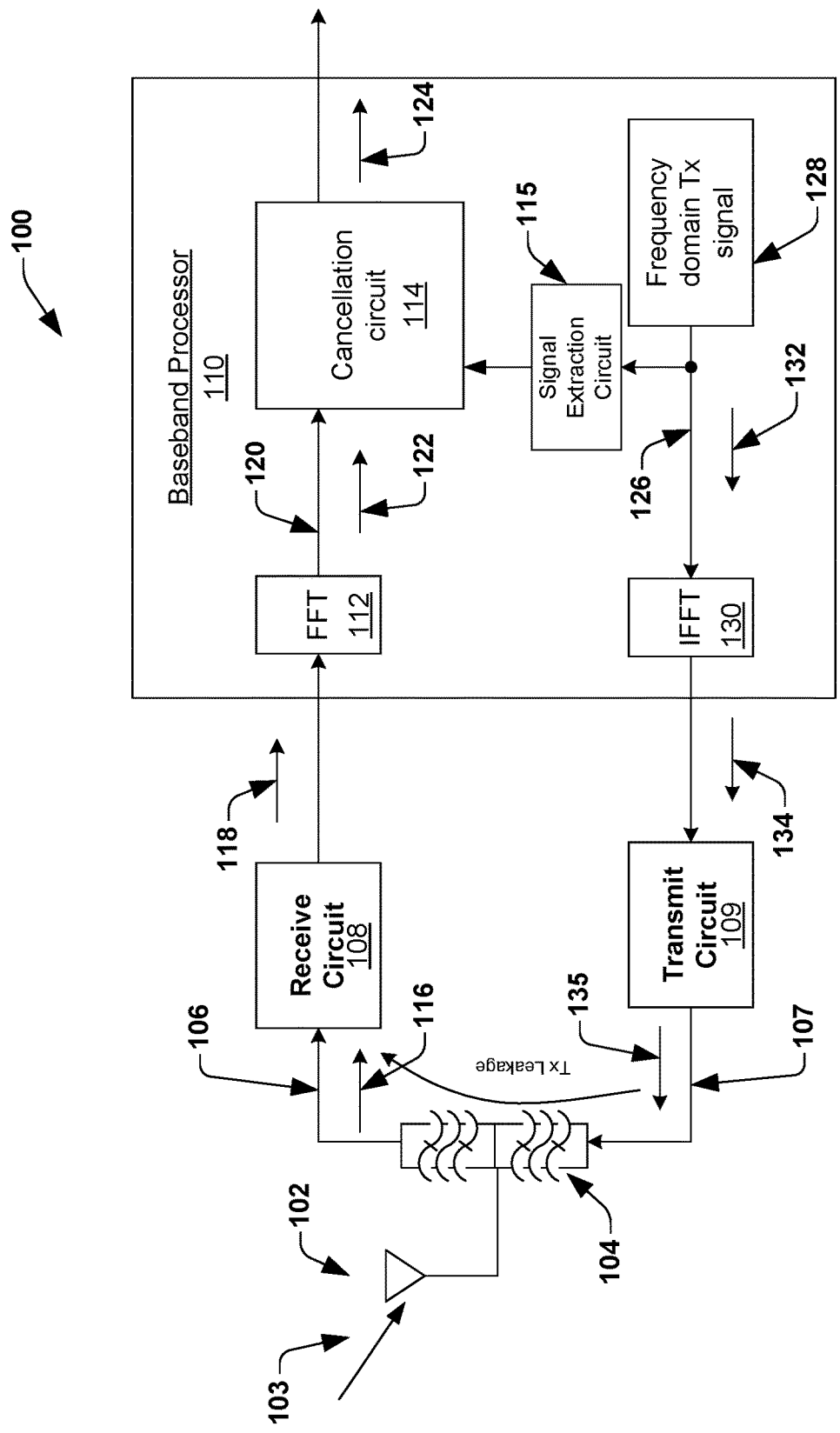
FIG. 1 illustrates a simplified block diagram of a long-term evolution (LTE) transceiver, according to one embodiment of the disclosure.

In one embodiment of the disclosure, a baseband processor associated with a long-term evolution (LTE) transceiver is disclosed. The baseband processor comprises a baseband receive (Rx) path configured to propagate a receive signal in frequency domain, associated with an Rx signal path of the transceiver, forming a baseband Rx signal, wherein the baseband Rx signal comprises a wanted Rx signal and an unwanted transmit (Tx) modulated spur, wherein the unwanted Tx modulated spur is generated based on a leakage of a Tx signal associated with a Tx signal path of the transceiver into the Rx signal path; and a baseband Tx path configured to propagate a Tx signal in frequency domain, associated with the Tx signal path of the transceiver, thereby forming a baseband Tx signal. Further, the baseband processor comprises a cancellation circuit coupled to the baseband Rx path, configured to receive the baseband Rx signal and the baseband Tx signal, and generate a cancellation signal to the baseband Rx signal, in order to cancel the unwanted Tx modulated spur from the baseband Rx signal, wherein the cancellation signal is generated based on the baseband Rx signal and the baseband Tx signal.

In one embodiment of the disclosure, a baseband processor associated with a carrier aggregation (CA) transceiver is disclosed. The baseband processor comprises a first baseband receive (Rx) path configured to propagate a first receive signal in frequency domain, associated with a first Rx signal path of the transceiver, forming a first baseband Rx signal having a first frequency associated therewith, wherein the first baseband Rx signal comprises a wanted first Rx signal and an unwanted first transmit (Tx) modulated spur, wherein the unwanted first Tx modulated spur is generated based on a leakage of a Tx signal associated with a Tx signal path of the transceiver into the first Rx signal path, and a second baseband receive (Rx) path configured to propagate a second receive signal in frequency domain, associated with a second Rx signal path of the transceiver, forming a second baseband Rx signal having a second, different frequency associated therewith, wherein the second baseband Rx signal comprises a wanted second Rx signal and an unwanted second Tx modulated spur, wherein the unwanted second Tx modulated spur is generated based on a leakage of the Tx signal associated with the Tx signal path of the transceiver into the second Rx signal path. In some embodiments, the baseband processor further comprises a baseband Tx path configured to propagate a Tx signal in frequency domain, associated with the Tx signal path of the transceiver, thereby forming a baseband Tx signal; and a cancellation circuit configured to estimate one or more first channel coefficients determined based on a correlation between the unwanted first Tx modulated spur in the first baseband Rx signal and the baseband Tx signal, and provide a first cancellation signal to the first baseband Rx signal in order to cancel the unwanted first Tx modulated spur from the first baseband Rx signal, wherein the first cancellation signal is generated based on modifying the baseband Tx signal in accordance with the estimated one or more first channel coefficients.

In one embodiment of the disclosure, a method for baseband processor associated with a long term evolution (LTE) transceiver is disclosed. The method comprises receiving at a cancellation circuit, a baseband receive (Rx) signal, associated with a baseband receive (Rx) path of the transceiver, wherein the baseband Rx signal comprises a wanted Rx signal associated with an Rx signal path of the transceiver and an unwanted transmit (Tx) modulated spur in frequency domain, wherein the unwanted Tx modulated spur is generated based on a leakage of a Tx signal associated with a Tx signal path of the transceiver into the Rx signal path and receiving at the cancellation circuit, a baseband Tx signal, associated with a baseband Tx path of the transceiver, wherein the baseband Tx signal comprises the Tx signal associated with the Tx signal path of the transceiver in frequency domain. The method further comprises providing a cancellation signal generated at the cancellation circuit to the baseband Rx signal, in order to cancel the unwanted Tx modulated spur from the baseband Rx signal, wherein the cancellation signal is generated based on the received baseband Rx signal and the baseband Tx signal.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the LTE FDD transceivers have a Tx-modulated spur interference problem associated therewith. In some embodiments, the Tx-modulated spur causes a significant degradation of an SNR of the wanted signal in LTE transceivers. Further, in some embodiments, the Tx-modulated spur problem restricts the use of several CA band combinations in LTE-CA and multi sim transceivers. Addressing this issue is of high importance as it enables more CA combinations (feature enabling), reduce RF isolation requirements and also scale downs the severity of the issue in the case of introducing higher downlink and/or uplink-CA in future. The issue of Tx-modulated spur typically appears when an RF transceiver operates in Frequency Division Duplexing (FDD) mode and becomes more dominant in CA scenarios.

In some embodiments, a modulated Tx signal from a transmitter associated with the LTE FDD transceiver leaks into a receiver (Rx) chain associated with the transceiver through a duplex filter. Although, the duplex filter reduces the amount of Tx signal leaking into the Rx chain, but the level of suppression is not sufficient in some embodiments. Further, due to the intermixing of the frequencies generated from multiple clock domains (reference clocks, ADC clocks, Rx-LOs), associated with the receive chain, a spur can occur at a frequency close to the duplex (transmit) frequency and appear at the Rx-LO side of the Rx chain. In addition, in some embodiments, when the transceiver in working in carrier aggregation (CA) mode, the Rx chain can comprise a plurality of receive paths and the harmonics of the Rx-local oscillators (LOs), each Rx-LO associated with a respective Rx path in the Rx chain, intermix with one another and produce spurs close to the transmit frequency. In such embodiments, the spur can occur at the Rx-LO side of one or more Rx paths associated with the Rx chain. This generated spur mix with the leaked Tx modulated signal and down converts the signal to the baseband, forming the Tx-modulated spur. In some embodiments, this down converted signal (i.e., the Tx-modulated spur) interferes with the wanted Rx signal which degrades noise figure (NF) of the transceiver significantly.

Existing solutions to mitigate the Tx-modulated spur problem include analog solutions like improved front end selectivity with high cost external filters to suppress the leaked Tx signal, improved on-chip isolation to minimize spur level at mixers and Low IF to avoid modulated spurs interfering the wanted signal which requires high (Image rejection ratio) IRR and high ADC bandwidth. The existing analog solutions, however, adversely affect the key performance indicators (KPIs) of radio frequency (RF) transceivers, thereby demanding active digital cancellation techniques. Therefore, an apparatus and a method for implementing a frequency domain digital cancellation technique for mitigating the Tx-modulated spur interference problem in LTE-FDD transceivers is proposed in this disclosure. The basic idea proposed herein is to actively mitigate the Tx-modulated spur interference in frequency domain by utilizing the Rx signal (wanted Rx signal+ unwanted Tx-modulated spur) and the Tx signal in frequency domain.

In typical implementations of LTE transceiver, the Tx signal is a single carrier frequency division multiple access (SC-FDMA) signal, and therefore, the whole Tx-signal is available in frequency domain, in a baseband processor of the LTE transceiver. Further, in the receiver side, in LTE, the Rx signal is an orthogonal frequency division multiplexing (OFDM) signal and is typically converted to frequency domain (FFT) and processed in the baseband processor. The proposed idea is based on the fact that, since the Rx signal (wanted Rx signal+Tx-interference) is converted to frequency domain in the baseband processor, the Tx-interference in the Rx signal can be removed by using already available frequency domain Tx signal (i.e., the SC-FDMA signal) within the baseband processor. In some embodiments, the proposed frequency domain digital cancellation technique enables to utilize the existing hardware platform associated with LTE transceivers, to effectively mitigate the modulated spurs. In some embodiments, the proposed frequency domain digital cancellation technique offer a very low complex interference cancellation, compared to existing time domain digital cancellation techniques.

FIG. 1 illustrates a simplified block diagram of a long-term evolution (LTE) transceiver 100, according to one embodiment of the disclosure. The LTE transceiver 100 comprises an antenna 102, a duplexer 104, a receive (Rx) chain 106, a transmit (Tx) chain 107 and a baseband processor 110. The antenna 102 is configured to receive an Rx signal 103 and provide the Rx signal 103 to the Rx chain 106, via the duplexer 104, thereby forming the overall Rx signal 116, during a receive mode of operation of the transceiver 100. The antenna 102 is further configured to transmit a Tx signal 135 associated with the Tx chain 107, during a transmit mode of operation of the transceiver 100. In frequency division duplex (FDD) mode, both the receive operation and the transmit operation occur simultaneously and due to the limited isolation provided by the duplexer 104, a portion of the Tx signal 135 from the Tx chain 107 leaks into the Rx chain 106. Therefore, in some embodiments, the overall Rx signal 116 comprises a wanted Rx signal and a Tx leakage signal. In some embodiments, the wanted Rx signal comprise the Rx signal 103 and some noise associated therewith, for example, thermal noise. In some embodiments, the Tx signal 135 is heavily shaped by the duplexer stop band transfer function to form the Tx leakage signal in the overall Rx signal 116.

The Rx chain 106 is configured to propagate the overall Rx signal 116 from the duplexer 104 to the baseband processor 110. The Rx chain 106 comprises an Rx circuit 108 configured to process the overall Rx signal 116 to generate a digital Rx signal 118. In some embodiments, the receive circuit 108 can comprise an analog front end circuit comprising a low-noise amplifier (LNA), a mixer etc. configured to down convert the overall Rx signal 116 to a baseband frequency range. In some embodiments, the Rx circuit 108 can further comprise a digital front end circuit comprising a low-pass filter (LPF), an analog to digital converter (ADC) etc. configured to convert the down converted Rx signal to the digital Rx signal 118. In some embodiments, the digital Rx signal 118 is in time domain. In some embodiments, the transceiver 100, while working in carrier aggregation (CA) mode, is configured to receive a plurality of Rx signals at different frequencies. In such embodiments, the Rx signal 103 can comprise a plurality of Rx signals, and the Rx chain 106 can comprise a plurality of Rx paths (not shown), each of the Rx paths configured to receive an Rx signal at a particular frequency. In such embodiments, each of the Rx paths can have a respective Rx circuit (e.g., the Rx circuit 108), associated therewith.

In some embodiments, due to the intermixing of the frequencies generated from multiple clock domains (Reference clocks, ADC clocks, Rx-LOs) within an Rx path, a spur can occur at the frequency close to the duplex (transmit) frequency. Further, in some embodiments, when the transceiver 100 is operating in the CA mode, the harmonics of the Rx-local oscillators (LOs), each Rx-LO associated with a respective Rx path in the Rx chain 106, intermix with one another and produce spurs close to the transmit frequency in one or more Rx paths. In some embodiments, the spur generated can appear at the Rx-LO side, of the Rx path (or on one or more Rx paths in CA mode). This spur mixes down the Tx leakage signal in the overall Rx signal (e.g., the overall Rx signal 116) into the receiver baseband, in the one or more of the respective Rx paths and forms a Tx-modulated spur that heavily degrades the receiver performance. Therefore, in such embodiments, the digital Rx signal (e.g., the digital Rx signal 118) at the output of the Rx circuit associated with the respective Rx paths comprises a wanted Rx signal and a Tx-modulated spur, further details of which are given in embodiments below. In some embodiments, this Tx-modulated spur heavily degrades the noise figure (NF) of the transceiver 100.

Referring back to FIG. 1 again, in this embodiment, for the ease of explanation, the receive chain 107 is shown to include only one Rx path. However, in other embodiments, for example, while the transceiver is working in the CA mode, the Rx chain 106 can comprise a plurality of Rx paths. The baseband processor 110 is coupled to the output of the Rx circuit 108 and is configured to receive the digital Rx signal 118. In some embodiments, the digital Rx signal 118 comprises a time domain signal. The baseband processor 110 comprises an FFT block 112 coupled to the Rx chain 106 and configured to convert the digital Rx signal 118 into frequency domain, thereby forming a baseband Rx signal 122. The baseband processor 110 further comprises a baseband Rx path 120 configured to propagate the baseband Rx signal 122 for further processing. In some embodiments, the baseband Rx signal 122 comprises a wanted Rx signal and an unwanted Tx-modulated spur, in frequency domain. In some embodiments, when the transceiver 100 is working in the CA mode, the baseband Rx path 120 can also comprise a plurality of baseband Rx paths, respectively associated with the plurality of Rx paths associated with the Rx chain 106.

The baseband processor 110 further comprises a cancellation circuit 114 coupled to the baseband Rx path 120 and configured to cancel or suppress the unwanted Tx-modulated spur in the baseband Rx signal 122, thereby generating an Rx output signal 124. When the transceiver 100 is working in the CA mode, in some embodiments, the cancellation circuit 114 is configured to cancel the unwanted Tx-modulated spur in the one or more baseband Rx paths associated with the Rx chain 106. Alternately, in other embodiments, the cancellation circuit 114 can comprise a plurality of cancellation circuits, each cancellation circuit associated with a respective baseband Rx path, in order to cancel the unwanted Tx-modulated spur in the corresponding baseband Rx path. For instance, in one example embodiment, the cancellation circuit 114 can comprise a first cancellation circuit associated with a first baseband Rx path and a second cancellation circuit associated with a second baseband Rx path for cancelling the unwanted Tx-modulated spur in the first baseband Rx path and the second baseband Rx path, respectively, associated with the Rx chain 106.

The baseband processor 110 further comprises a baseband Tx path 126 configured to propagate a baseband Tx signal 132 to the antenna 102. In some embodiments, the baseband Tx signal 132 comprises a frequency domain version of the Tx signal 135. In some embodiments, the Tx signal 135 comprises a single carrier frequency domain multiple access (SC-FDMA) signal. In some embodiments, the baseband processor 110 further comprises a signal extraction circuit 115 configured to extract the baseband Tx signal 132 from the baseband Tx path 126 and provide the baseband Tx signal 132 to the cancellation circuit 114. In some embodiments, the cancellation circuit 114 is configured to cancel or suppress the unwanted Tx-modulated spur in the baseband Rx signal 122, based on the baseband Rx signal 122 and the baseband Tx signal 132.

In some embodiments, the baseband processor 110 further comprises an IFFT circuit 130 configured to convert the baseband Tx signal 126 in frequency domain to a digital Tx signal 134 in time domain and provide the digital Tx signal 134 to the Tx chain 107. The Tx chain 107 comprises a Tx circuit 109 configured to process the digital Tx signal 134, to form the Tx signal 135. In some embodiments, the Tx circuit 109 can comprise a digital-to-analog converter (DAC) to convert the digital Tx signal 134 to an analog signal. In some embodiments, the Tx circuit 109 can further comprise a modulation circuit (e.g., an amplitude modulator, a phase modulator, IQ modulator etc.) to generate a modulated Tx signal comprising the Tx signal 135, for transmission. In some embodiments, in CA transceivers, the Tx chain 107 can comprise one or more Tx paths for propagating a respective Tx signal having a specific frequency associated therewith (not shown), each Tx path having a Tx circuit (e.g., the Tx circuit 109) associated therewith. In such embodiments, the baseband Tx path 126 associated with the baseband processor 110 can also comprise one or more baseband Tx paths respectively coupled to the one or more Tx paths. In such embodiments, the cancellation circuit 114 can be configured to receive baseband Tx signals from the one or more baseband Tx paths, in order to cancel the unwanted Tx-modulated spur in the one or more baseband Rx paths associated with the baseband processor 110.

Figure 2:
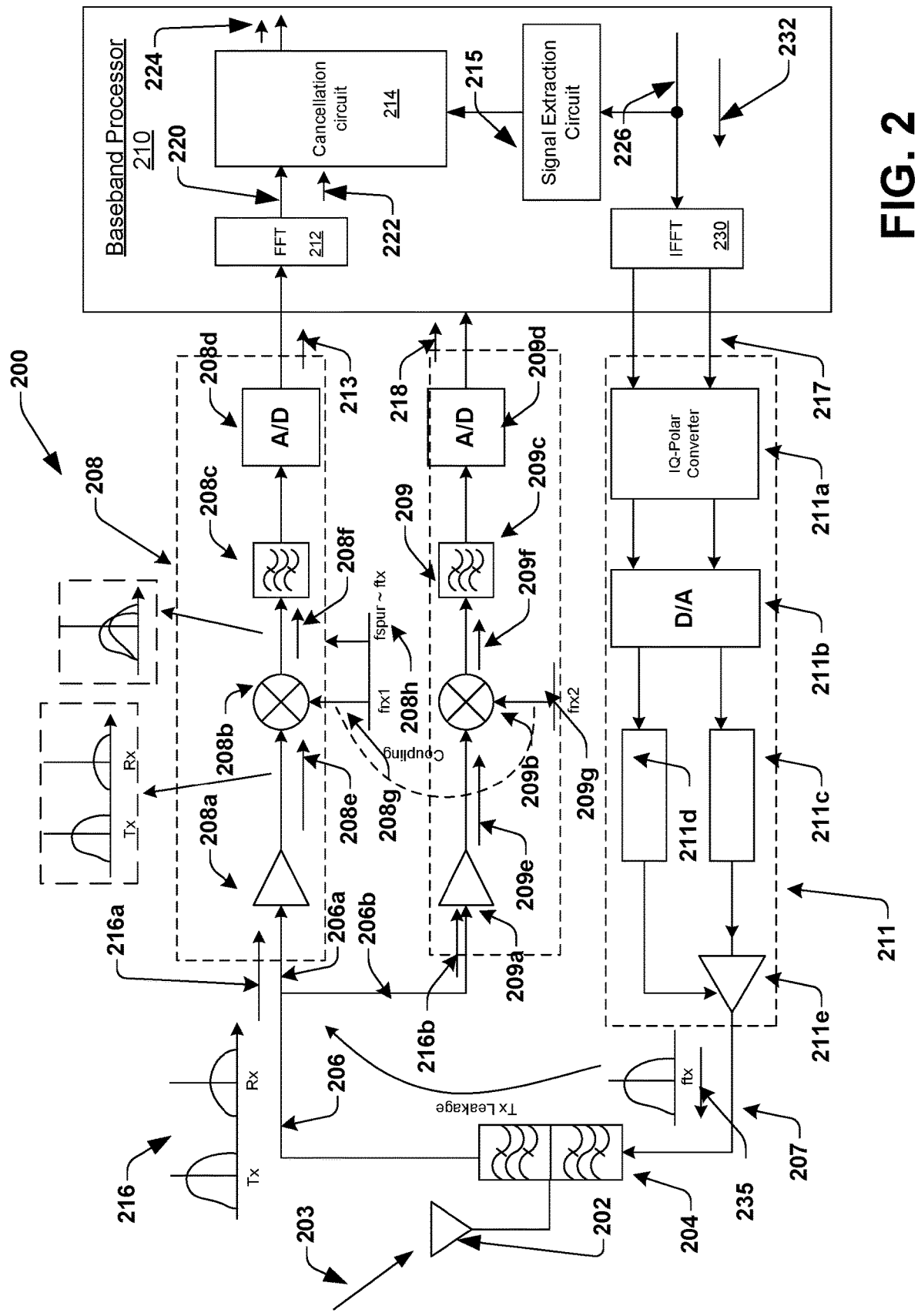
FIG. 2 illustrates an example implementation of a long-term evolution (LTE) carrier aggregation (CA) transceiver, according to one embodiment of the disclosure.

FIG. 2 illustrates an example implementation of a long-term evolution (LTE) carrier aggregation (CA) transceiver 200, according to one embodiment of the disclosure. In some embodiments, the transceiver 200 depicts one possible way of implementing the transceiver 100 in FIG. 1. However, other implementations of the transceiver 100 are also contemplated to be within the scope of this disclosure. The LTE-CA transceiver 200 comprises an antenna 202, a duplexer 204, a receive (Rx) chain 206, a transmit (Tx) chain 207 and a baseband processor 210. The antenna 202 is configured to receive an Rx signal 203 and provide the Rx signal 203 to the Rx chain 206, via the duplexer 204, thereby forming the overall Rx signal 216, during a receive mode of operation of the transceiver 200. The antenna 202 is further configured to transmit a Tx signal 235 associated with the Tx chain 207, during a transmit mode of operation of the transceiver 200. Due to the limited isolation provided by the duplexer 204, a portion of the Tx signal 235 from the Tx chain 207 leaks into the Rx chain 206, during a frequency division duplex (FDD) mode. Therefore, in some embodiments, the overall Rx signal 216 comprises a wanted Rx signal and a Tx leakage signal.

The Rx chain 206 is configured to propagate the overall Rx signal 216 from the duplexer 204 to the baseband processor 210. In some embodiments, for example, when the transceiver 200 is working in a CA mode, the Rx signal 203 comprises a plurality of Rx signals at different Rx frequencies. Therefore, the overall Rx signal 216 also comprises a plurality of wanted signals at different Rx frequencies. In this embodiment, the Rx chain 206 comprises a first Rx path 206a configured to receive a first overall Rx signal 216a at a first Rx frequency and a second Rx path 206b configured to receive a second overall Rx signal 216b at a second, different Rx frequency. In other embodiments, however, the Rx chain 206 can comprise a plurality of Rx paths, in order to receive overall Rx signals at a plurality of different Rx frequencies.

The first Rx path 206a comprises a first Rx circuit 208 configured to process the first overall Rx signal 216a to generate a first digital Rx signal 213. Further, the second Rx path 216b comprises a second Rx circuit 209 configured to process the second overall Rx signal 216b to generate a second digital Rx signal 218. The first Rx circuit 208 comprises a low noise amplifier (LNA) 208a configured to amplify the first overall Rx signal 216a to form the amplified first overall Rx signal 208e and a first mixer 208b configured to down-convert the amplified first overall Rx signal 208e to a down-converted first Rx signal 208f. Further, the first Rx circuit 208 comprises low-pass filter 208c configured to filter the down-converted first Rx signal 208f and an analog-to-digital converter (ADC) 208d configured to digitize the down-converted first Rx signal 208f to form the first digital Rx signal 213. Similarly, the second Rx circuit 209 comprises a low noise amplifier (LNA) 209a configured to amplify the second overall Rx signal 216b to form the amplified second overall Rx signal 209e and a second mixer 209b configured to down-convert the amplified second overall Rx signal 209e to a down-converted second Rx signal 209f. Further, the second Rx circuit 209 comprises low-pass filter 209c configured to filter the down-converted second Rx signal 209f and an analog-to-digital converter (ADC) 209d configured to digitize the down-converted second Rx signal 209f to form the second digital Rx signal 218. In other embodiments, however, the first Rx circuit 208 and the second Rx circuit 209 can comprise more or less than the above components.

In some embodiments, the harmonics of the Rx-local oscillators (LOs), for example, $f_{rx1}$ 208g and $f_{rx2}$ 209g, intermix with one another and produce spurs, for example, $f_{spur}$ 208h, close to the transmit frequency $f_{rx}$. In some embodiments, $f_{spur}$ 208h may also be generated due to the intermixing of the frequencies generated from multiple clock domains, for example, reference clocks, ADC clocks, Rx-LOs, associated with a single Rx path (the Rx path 206a). In such embodiments, a spur, for example, $f_{spur}$ 208h, appear at the Rx-LO side, in one or more Rx paths. In this embodiment, the $f_{spur}$ is shown to occur only in the first Rx path 206a, however, in other embodiments, the $f_{spur}$ can occur on both the first Rx path 206a and the second Rx path 206b. This spur, that is, $f_{spur}$ 208h mixes down the Tx leakage signal in the amplified first overall Rx signal 208e into the receiver baseband and forms a Tx-modulated spur in the down-converted first Rx signal 208f that heavily degrades the receiver performance. Therefore, the first digital Rx signal 213 at the output of the first Rx circuit 208 comprises a wanted Rx signal and a Tx-modulated spur. In other embodiments, if the $f_{spur}$ occur in the second Rx path (i.e., associated with the Rx-LO 209g), then the second digital Rx signal 218 at the output of the second Rx circuit 209 can also comprise a wanted Rx signal and a Tx-modulated spur.

Figure 3:
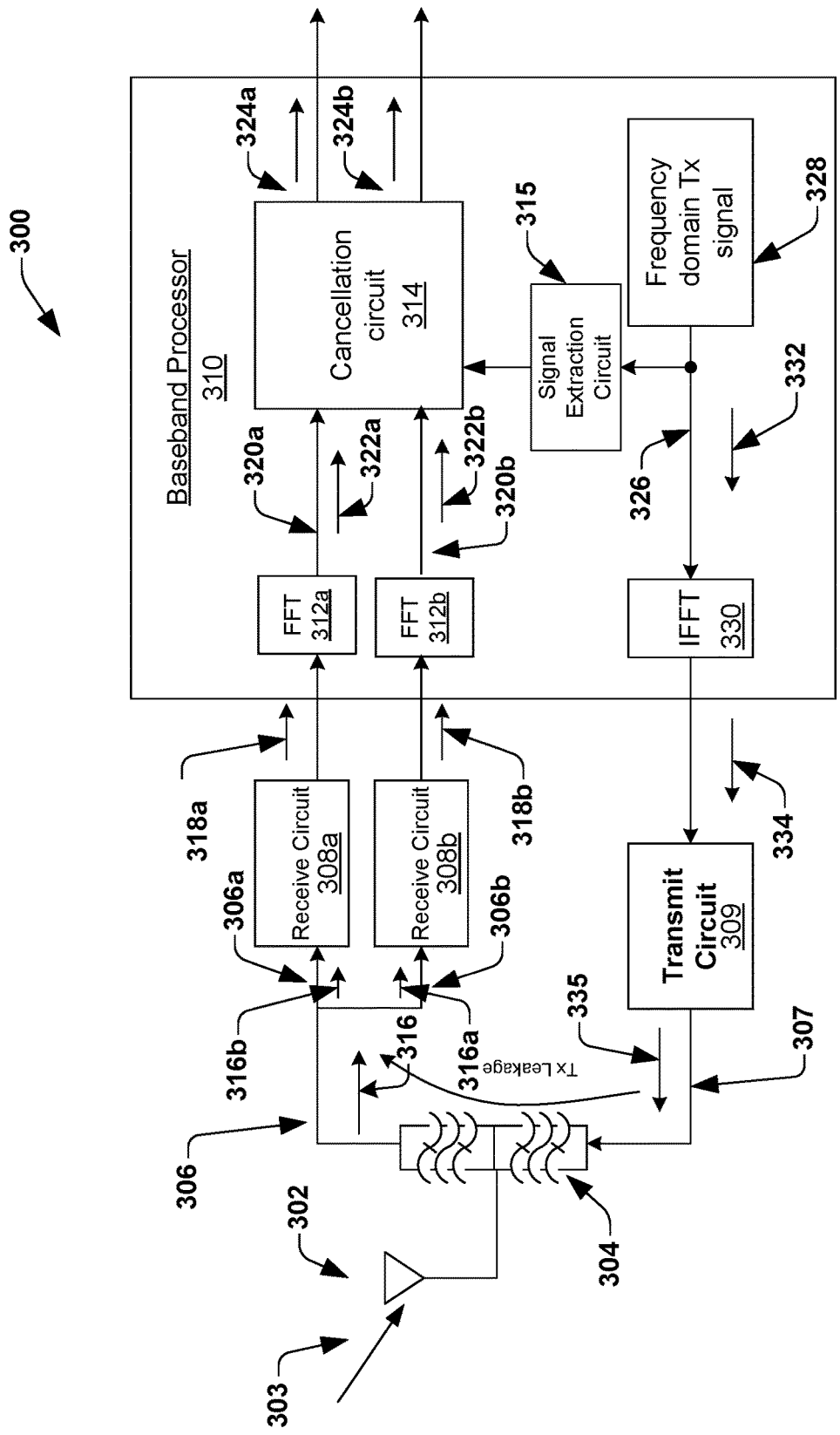
FIG. 3 illustrates an example implementation of a long-term evolution (LTE) carrier aggregation (CA) transceiver, according to another embodiment of the disclosure.

The baseband processor 210 is coupled to the output of the first Rx circuit 208 associated with the first Rx path 206*a* and the second Rx circuit 209 associated with the second Rx path 206*b*, and is configured to receive the first digital Rx signal 213 and the second digital Rx signal 218. In some embodiments, the first digital Rx signal 213 and the second digital Rx signal 218 comprise time domain signals. The baseband processor 210 comprises an FFT block 212 coupled to the first Rx path 206*a* and configured to convert the first digital Rx signal 213 into frequency domain, thereby forming a first baseband Rx signal 222. The baseband processor 210 further comprises a first baseband Rx path 220 configured to propagate the first baseband Rx signal 122 for further processing. In some embodiments, the first baseband Rx signal 222 comprises a wanted first Rx signal and an unwanted Tx-modulated spur, in frequency domain. The baseband processor 210 further comprises an FFT block 212 coupled to the second Rx path 206*b* (not shown for the ease of reference) and configured to convert the second digital Rx signal 218 into frequency domain, thereby forming a second baseband Rx signal (not shown), as can be seen in FIG. 3 below. The baseband processor 210 can further comprise a second baseband Rx path (not shown) configured to propagate the second baseband Rx signal for further processing.

The baseband processor 210 further comprises a cancellation circuit 214 coupled to the first baseband Rx path 220 and configured to cancel or suppress the unwanted Tx-modulated spur in the first baseband Rx signal 222, thereby generating an Rx output signal 224. In some embodiments, the cancellation circuit 214 can also be coupled to the second baseband path, as can be seen in FIG. 3 below. In some embodiments, if the second baseband Rx signal comprises a Tx-modulated spur, the cancellation circuit 214 can also be configured to cancel the unwanted Tx-modulated spur in the second baseband Rx signal in the second baseband path associated with the second Rx path 206*b*. In some embodiments, the cancellation circuit 214 can comprise a first cancellation circuit coupled to the first baseband signal path 220 and a second cancellation circuit coupled to the second baseband signal path for cancelling the unwanted Tx-modulated spur in the first Rx path 206*a* and the second Rx path 206*b*, respectively.

In some embodiments, the cancellation circuit 214 is configured to generate a cancellation signal indicative of the unwanted Tx-modulated spur in the baseband Rx signal (e.g., the first baseband Rx signal 222), and subtract the cancellation signal from the first baseband Rx signal 222, in order to cancel or suppress the unwanted Tx-modulated spur in the first baseband Rx signal 222, detailed explanations of which are provided in an embodiment below. In some embodiments, the cancellation signal is generated at the cancellation circuit 214 based on an estimation of a channel coefficient that is determined based on a correlation between the unwanted Tx-modulated spur in the Rx output signal 224 and the baseband Tx signal 232, and modifying the baseband Tx signal 232 in accordance with the estimate of the channel coefficient. In some embodiments, the channel coefficient is estimated within the cancellation circuit 214. In some embodiments, the channel coefficient for modifying the baseband Tx signal 232 can comprise one or more channel coefficients corresponding to one or more Tx subcarriers associated with the baseband Tx signal 232.

Further, in some embodiments, modifying the baseband Tx signal 232 in accordance with the estimated channel coefficient, comprises multiplying the baseband Tx signal 232 with the estimated channel coefficient, in order to generate the cancellation signal that is indicative of the unwanted Tx-modulated spur in the first baseband Rx signal 222. In some embodiments, the cancellation circuit 214 is configured to cancel the unwanted Tx-modulated spur in the first baseband Rx signal 222 on a subcarrier basis. In frequency domain, the first baseband Rx signal 222 can be viewed as N independent and orthogonal Rx subcarriers, where on each Rx subcarrier lies a wanted Rx portion and an unwanted Tx-modulated spur portion. Therefore, in such embodiments, the unwanted Tx-modulated spur on each of the Rx subcarriers are independently estimated and cancelled, further details of which are provided in an embodiment below.

The baseband processor 210 further comprises a baseband Tx path 226 configured to propagate a baseband Tx signal 232 to the antenna 202. In some embodiments, the baseband Tx signal 232 comprises a frequency domain version of the Tx signal 235. In some embodiments, the Tx signal 235 comprises a single carrier frequency domain multiple access (SC-FDMA) signal. In some embodiments, the baseband processor 210 further comprises a signal extraction circuit 215 configured to extract the baseband Tx signal 232 from the baseband Tx path 226 and provide the baseband Tx signal 232 to the cancellation circuit 214. In some embodiments, the cancellation circuit 214 is configured to cancel or suppress the unwanted Tx-modulated spur in the first baseband Rx signal 222, based on the first baseband Rx signal 222 and the baseband Tx signal 232.

In some embodiments, the baseband processor 210 further comprises an IFFT circuit 230 configured to convert the baseband Tx signal 226 in frequency domain to a digital Tx signal 217 in time domain and provide the digital Tx signal 217 to the Tx chain 207. The Tx chain 207 comprises a Tx circuit 211 configured to process the digital Tx signal 217, to form the Tx signal 235. In some embodiments, the Tx circuit 211 comprises an IQ-polar converter 211 to convert the digital Tx signal 217 from IQ domain to polar domain, a digital-to-analog converter (DAC) 211*b* to convert the digital Tx signal 217 to an analog Tx signal, a polar modulation circuit (e.g., an amplitude modulator 211*c* and a phase modulator 211*d*) configured to convert the analog Tx signal to a modulated Tx signal and a power amplifier (PA) 211*e* to amplify the modulated Tx signal to form the Tx signal 235. However, in other embodiments, the Tx circuit 211 can comprise more or less than the above components. In some embodiments, the Tx circuit 211 can comprise a Tx IQ modulator circuit, instead of polar modulation circuit described above. In such embodiments, the IQ-polar converter 211 may eliminated from the Tx circuit 211.

In some embodiments, in CA transceivers, the Tx chain 207 can comprise one or more Tx paths for propagating a respective Tx signal at a specified frequency (not shown), each Tx path having a Tx circuit (e.g., the Tx circuit 211) associated therewith. In such embodiments, the baseband Tx path 226 associated with the baseband processor 210 can also comprise one or more baseband Tx paths respectively coupled to the one or more Tx paths. In such embodiments, the cancellation circuit 214 can be configured to receive baseband Tx signal from the one or more baseband Tx paths, in order to cancel the unwanted Tx-modulated spur in the one or more baseband Rx paths associated with the baseband processor 210. For example, in some embodiments, if it is known that the Tx signal from a first Tx path of the one or more Tx paths is causing interference in the overall Rx signal 216*a* in the first Rx path 206*a*, then the cancellation circuit 214 can be configured to utilize the first baseband Tx signal associated with the first Tx path, to achieve the cancellation of the Tx-modulated spur in the first baseband Rx signal 222. However, in other embodiments, if it is known that the Tx signal from a second Tx path of the one or more Tx paths is causing interference in the overall Rx signal 216a in the first Rx path 206a, then the cancellation circuit 214 can be configured to utilize the second baseband Tx signal associated with the second Tx path, to achieve the cancellation of the Tx-modulated spur in the first baseband Rx signal 222.

FIG. 3 illustrates an example implementation of a long-term evolution (LTE) carrier aggregation (CA) transceiver 300, according to another embodiment of the disclosure. In some embodiments, the transceiver 300 depicts another possible way of implementing the transceiver 100 in FIG. 1. In some embodiments, the transceiver 300 is similar to the transceiver 200 in FIG. 2, with the cancellation circuit configured to cancel the unwanted Tx-modulated spur in both the first Rx path and the second Rx path, rather than for just the first Rx path as explained in FIG. 2. The LTE-CA transceiver 300 comprises an antenna 302, a duplexer 304, a receive (Rx) chain 306, a transmit (Tx) chain 307 and a baseband processor 310. The antenna 302 is configured to receive an Rx signal 303 and provide the Rx signal 303 to the Rx chain 306, via the duplexer 304, thereby forming the overall Rx signal 316, during a receive mode of operation of the transceiver 300. The antenna 302 is further configured to transmit a Tx signal 335 associated with the Tx chain 307, during a transmit mode of operation of the transceiver 300. Due to the limited isolation provided by the duplexer 304, a portion of the Tx signal 335 from the Tx chain 307 leaks into the Rx chain 306, during a frequency division duplex (FDD) mode. Therefore, in some embodiments, the overall Rx signal 316 comprises a wanted Rx signal and a Tx leakage signal.

The Rx chain 306 is configured to propagate the overall Rx signal 316 from the duplexer 304 to the baseband processor 310. In some embodiments, for example, when the transceiver 300 is working in a CA mode, the Rx signal 303 comprises a plurality of Rx signals at different Rx frequencies. Therefore, the overall Rx signal 316 also comprises a plurality of wanted Rx signals at different Rx frequencies. In this embodiment, the Rx chain 306 comprises a first Rx path 306a configured to receive a first overall Rx signal 316a at a first Rx frequency and a second Rx path 306b configured to receive a second overall Rx signal 316b at a second, different Rx frequency. The first Rx path 306a comprises a first Rx circuit 308a configured to process the first overall Rx signal 316a to generate a first digital Rx signal 318a. Further, the second Rx path 306b comprises a second Rx circuit 308b configured to process the second overall Rx signal 316b to generate a second digital Rx signal 318b. The first Rx circuit 308a and the second Rx circuit 308b can be implemented in the same way as the first Rx circuit 208 in FIG. 2 and the second Rx circuit 209 in FIG. 2, respectively, however, is shown in a simplified way herein for easier reference.

Due to the leakage of the Tx signal 335 to the Rx chain 306 and also due to the intermixing of Rx-LOs from different Rx paths (e.g., the first Rx path 306a and the second Rx path 306b), or due to the intermixing of frequencies generated from multiple clock domains associated with a single Rx path, unwanted Tx-modulated spurs occur, as explained above with respect to FIG. 2 above. In this embodiment, the unwanted Tx-modulated spur is assumed to occur on both the first Rx path 306a and the second Rx path 306b. Therefore, the both the first digital Rx signal 318a and the second digital Rx signal 318b comprises unwanted Tx-modulated spurs. The baseband processor 310 is coupled to the output of the first Rx circuit 308a associated with the first Rx path 306a and the second Rx circuit 308b associated with the second Rx path 306b, and is configured to receive the first digital Rx signal 318a and the second digital Rx signal 318b. In some embodiments, the first digital Rx signal 318a and the second digital Rx signal 318b comprise time domain signals.

The baseband processor 310 comprises a first FFT block 312a coupled to the first Rx path 306a and configured to convert the first digital Rx signal 318a into frequency domain, thereby forming a first baseband Rx signal 322a in frequency domain. The baseband processor 310 further comprises a second FFT block 312b coupled to the second Rx path 306b and configured to convert the second digital Rx signal 318b into frequency domain, thereby forming a second baseband Rx signal 322b. The baseband processor 310 further comprises a first baseband Rx path 320a configured to propagate the first baseband Rx signal 322a and a second baseband Rx path 320b configured to propagate the second baseband Rx signal 322b for further processing. The baseband processor 310 further comprises a cancellation circuit 314 coupled to the first baseband Rx path 320a and configured to cancel or suppress the unwanted Tx-modulated spur in the first baseband Rx signal 322a, thereby generating a first Rx output signal 324a. The cancellation circuit 314 is further coupled to the second baseband Rx path 320b and configured to cancel or suppress the unwanted Tx-modulated spur in the second baseband Rx signal 322b, thereby generating a second Rx output signal 324b. In some embodiments, the cancellation circuit 314 can comprise a first cancellation circuit and a second cancellation circuit for cancelling the unwanted Tx-modulated spur in the first baseband Rx path 320a and the second baseband Rx path 320b, respectively.

The baseband processor 310 further comprises a baseband Tx path 326 configured to propagate a baseband Tx signal 332 to the antenna 302. In some embodiments, the baseband Tx signal 332 comprises a frequency domain version of the Tx signal 335. In some embodiments, the Tx signal 335 comprises a single carrier frequency domain multiple access (SC-FDMA) signal. In some embodiments, the baseband processor 310 further comprises a signal extraction circuit 315 configured to extract the baseband Tx signal 332 from the baseband Tx path 326 and provide the baseband Tx signal 332 to the cancellation circuit 314. In some embodiments, the cancellation circuit 314 is configured to cancel or suppress the unwanted Tx-modulated spur in the first baseband Rx signal 322a, based on the first baseband Rx signal 322a and the baseband Tx signal 332. Similarly, the cancellation circuit 314 is further configured to cancel or suppress the unwanted Tx-modulated spur in the second baseband Rx signal 322b, based on the second baseband Rx signal 322b and the baseband Tx signal 332.

In some embodiments, the baseband processor 310 further comprises an IFFT circuit 330 configured to convert the baseband Tx signal 326 in frequency domain to a digital Tx signal 334 in time domain and provide the digital Tx signal 334 to the Tx chain 307. The Tx chain 307 comprises a Tx circuit 309 configured to process the digital Tx signal 334, to form the Tx signal 335. In some embodiments, the Tx circuit 309 can be implemented as the Tx circuit 211 in FIG. 2 above, however, is not shown herein for easier reference. However, in other embodiments, the Tx circuit 309 can comprise more or less than the components explained with respect to the Tx circuit 211 in FIG. 2.

Figure 4:
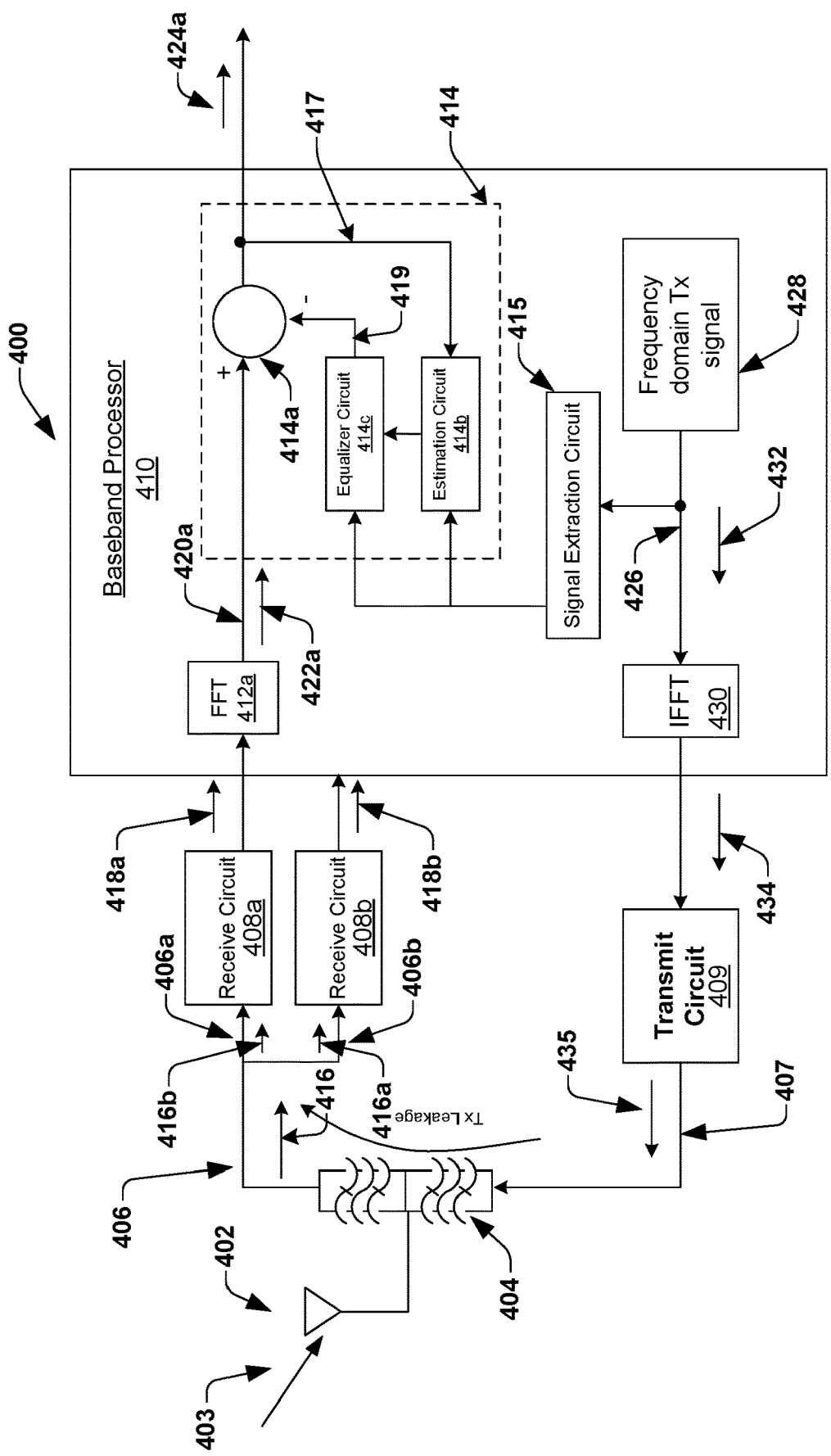
FIG. 4 illustrates an example implementation of a cancellation circuit associated with a long-term evolution (LTE) carrier aggregation (CA) transceiver, according to one embodiment of the disclosure.

FIG. 4 illustrates an example implementation of a cancellation circuit associated with a long-term evolution (LTE) transceiver 400, according to one embodiment of the disclosure. In some embodiments, the cancellation circuit 414 depicts a possible way of implementing the cancellation circuit 114 of the transceiver 100 in FIG. 1 or the cancellation circuit 214 of the LTE-CA transceiver 200 in FIG. 2. However, other implementations of the cancellation circuit are also contemplated to be within the scope of this disclosure. In this example embodiment, the cancellation circuit 414 is implemented as part of an LTE-CA transceiver 400 comprising a plurality of Rx paths. However, in other embodiments, the cancellation circuit 414 can also be implemented in other LTE-FDD transceivers that comprise a single Rx path. In some embodiments, the transceiver 400 is similar to the transceiver 200 in FIG. 2, and can be explained similar to the transceiver 200 in FIG. 2. The LTE-CA transceiver 400 comprises an antenna 402, a duplexer 404, a receive (Rx) chain 406, a transmit (Tx) chain 407 and a baseband processor 410. The antenna 402 is configured to receive an Rx signal 403 and provide the Rx signal 403 to the Rx chain 406, via the duplexer 404, thereby forming the overall Rx signal 416, during a receive mode of operation of the transceiver 400. The antenna 402 is further configured to transmit a Tx signal 435 associated with the Tx chain 407, during a transmit mode of operation of the transceiver 400. Due to the limited isolation provided by the duplexer 404, a portion of the Tx signal 435 from the Tx chain 407 leaks into the Rx chain 406, during a frequency division duplex (FDD) mode. Therefore, in some embodiments, the overall Rx signal 416 comprises a wanted Rx signal and a Tx leakage signal.

The Rx chain 406 is configured to propagate the overall Rx signal 416 from the duplexer 404 to the baseband processor 410. In some embodiments, for example, when the transceiver 400 is working in a CA mode, the Rx signal 403 comprises a plurality of Rx signals at different Rx frequencies. Therefore, the overall Rx signal 416 also comprises a plurality of wanted Rx signals at different Rx frequencies. In this embodiment, the Rx chain 406 comprises a first Rx path 406a configured to receive a first overall Rx signal 416a at a first Rx frequency and a second Rx path 406b configured to receive a second overall Rx signal 416b at a second, different Rx frequency. The first Rx path 406a comprises a first Rx circuit 408a configured to process the first overall Rx signal 416a to generate a first digital Rx signal 418a. Further, the second Rx path 406b comprises a second Rx circuit 408b configured to process the second overall Rx signal 416b to generate a second digital Rx signal 418b. The first Rx circuit 408a and the second Rx circuit 408b can be implemented in the same way as the first Rx circuit 208 in FIG. 2 and the second Rx circuit 209 in FIG. 2, respectively, however, is shown in a simplified way herein for easier reference.

Due to the leakage of the Tx signal 435 to the Rx chain 306 and also due to the intermixing of Rx-LO from different Rx paths (e.g., the first Rx path 406a and the second Rx path 406b), or due to the intermixing of frequencies generated from multiple clock domains associated with a single Rx path, unwanted Tx-modulated spurs occur, as explained above with respect to FIG. 2 above. In this embodiment, the unwanted Tx-modulated spur is assumed to occur only on the first Rx path 406a, for easier explanation. However, in other embodiments, the unwanted Tx-modulated spur can occur on the first Rx path 406a and/or the second Rx path 406b. Therefore, in this embodiment, the first digital Rx signal 418a comprises unwanted Tx-modulated spurs. The baseband processor 410 is coupled to the output of the first Rx circuit 408a associated with the first Rx path 406a and the second Rx circuit 408b associated with the second Rx path 406b, and is configured to receive the first digital Rx signal 418a and the second digital Rx signal 418b. In some embodiments, the first digital Rx signal 418a and the second digital Rx signal 418b comprise time domain signals.

The baseband processor 410 comprises a first FFT block 412a coupled to the first Rx path 406a and configured to convert the first digital Rx signal 418a into frequency domain, thereby forming a first baseband Rx signal 422a. The baseband processor 410 can further comprise a second FFT block coupled to the second Rx path 406b and configured to convert the second digital Rx signal 418b into frequency domain, thereby forming a second baseband Rx signal, as explained above with respect to FIG. 3 above, but not shown here for easier reference. The baseband processor 410 further comprises a first baseband Rx path 420a configured to propagate the first baseband Rx signal 422a. In addition, the baseband processor 410 can comprise a second baseband Rx path configured to propagate the second baseband Rx signal for further processing, as explained above with respect to FIG. 3 above, but not shown here for easier reference.

The baseband processor 410 further comprises a cancellation circuit 414 coupled to the first baseband Rx path 420a and configured to cancel or suppress the unwanted Tx-modulated spur in the first baseband Rx signal 422a, thereby generating a first Rx output signal 424a. In some embodiments, the cancellation circuit 414 can be further coupled to the second baseband Rx path. In some embodiments, when the second digital Rx signal 418b comprises the unwanted Tx-modulated spur, the cancellation circuit 414 can be further configured to cancel or suppress the unwanted Tx-modulated spur in the second baseband Rx signal, thereby generating a second Rx output signal, as explained above with respect to FIG. 3 above. In some embodiments, the cancellation circuit 414 can comprise a first cancellation circuit and a second cancellation circuit for cancelling the unwanted Tx-modulated spur in the first baseband Rx path 420a and the second baseband Rx path 420b, respectively.

The baseband processor 410 further comprises a baseband Tx path 426 configured to propagate a baseband Tx signal 432 to the antenna 402. In some embodiments, the baseband Tx signal 432 comprises a Tx signal (e.g., the Tx signal 435) in frequency domain. In some embodiments, the Tx signal 435 comprises a single carrier frequency domain multiple access (SC-FDMA) signal. In some embodiments, the baseband processor 410 further comprises a signal extraction circuit 415 configured to extract the baseband Tx signal 432 from the baseband Tx path 426 and provide the baseband Tx signal 432 to the cancellation circuit 414. In some embodiments, the cancellation circuit 414 is configured to cancel or suppress the unwanted Tx-modulated spur in the first baseband Rx signal 422a, based on the first baseband Rx signal 422a and the baseband Tx signal 432. Similarly, in some embodiments, the cancellation circuit 414 can also be configured to cancel or suppress the unwanted Tx-modulated spur in the second baseband Rx signal, based on the second baseband Rx signal and the baseband Tx signal 432.

The cancellation circuit 414 comprises a subtraction circuit 414a, an estimation circuit 414b and an equalizer circuit 414c. In this embodiment, the subtraction circuit 414a, the estimation circuit 414b and the equalizer circuit 414c are explained with reference to the cancellation of the unwanted Tx-modulated spur in the first baseband Rx signal 422a. However, in other embodiments, the subtraction circuit 414a, the estimation circuit 414b and the equalizer circuit 414c can also be utilized for the cancellation of the unwanted Tx-modulated spur in the second baseband Rx signal 422a. Alternately, in other embodiments, a first cancellation circuit associated with the first baseband Rx path 420 can comprise a first subtraction circuit, a first estimation circuit and a first equalizer circuit, and a second cancellation circuit associated with the second baseband Rx path can comprise a second subtraction circuit, a second estimation circuit and a second equalizer circuit. All the above possibilities are contemplated to be within the scope of this disclosure. Further, the cancellation circuit 314 in FIG. 3, the cancellation circuit 214 in FIG. 2 and the cancellation circuit 114 in FIG. 1 can be implemented in a similar way as the cancellation circuit 414.

In this embodiment, the cancellation circuit 414 is configured to cancel or suppress the unwanted Tx-modulated spur in the first baseband Rx signal 422a based on subtraction a cancellation signal 419 from the first baseband Rx signal 422a. In some embodiments, the subtraction circuit 414a is coupled to the first baseband path 420a and configured to receive the first baseband Rx signal 422a. The subtraction circuit 414a is further configured to receive the cancellation signal 419 from the equalizer circuit 414c and subtract the cancellation signal 419 from the first baseband Rx signal 422a. In some embodiments, the cancellation signal 419 is generated at the equalizer circuit 414c based on modifying the baseband Tx signal 432 at the equalizer circuit 414c, so that the cancellation signal 419 is an approximation of the unwanted Tx-modulated spur in the first baseband Rx signal 422a. In some embodiments, the baseband Tx signal 432 is modified based on an estimate of a channel coefficient, that is determined based on a correlation between the unwanted Tx-modulated spur in the first baseband Rx signal 422a and the baseband Tx signal 432. In some embodiments, the estimated channel coefficient can comprise one or more channel coefficients corresponding to one or more Tx subcarriers associated with the baseband Tx signal 432. In some embodiments, the estimate of channel coefficient indicates a measure by which the unwanted Tx-modulated spur in the first baseband Rx signal 422a differ from the baseband Tx signal 432. In some embodiments, modifying the baseband Tx signal 432 comprises multiplying the baseband Tx signal 432 with the estimate of the channel coefficient.

In some embodiments, the channel coefficient (i.e., the one or more channel coefficients corresponding to one or more Tx subcarriers associated with the baseband Tx signal 432) for multiplying the baseband Tx signal 432 is determined at the estimation circuit 414b. In some embodiments, the estimation circuit 414b is coupled to an output of the subtraction circuit 414a and is configured to receive an error signal 417. In some embodiments, the error signal 417 comprises the first Rx output signal 424a comprising a wanted Rx signal and the unwanted Tx-modulated spur remaining at the output of the subtraction circuit 414a. The estimation circuit 414b is further configured to receive the baseband Tx signal 432 from the signal extraction circuit 415 and correlate the unwanted Tx-modulated spur in the error signal 417 to the baseband Tx signal 432, in order to determine the one or more channel coefficients. In some embodiments, the channel coefficients are determined at the estimation circuit 414b, in accordance with a predetermined block adaptive algorithm (e.g., LMS algorithm, adaptive filter algorithm etc.). That is, the channel coefficients are adaptively determined at the estimation circuit 414b, whenever a correlation exists between the unwanted Tx-modulated spur in the error signal 417 and the baseband Tx signal 432. In some embodiments, a correlation between the unwanted Tx-modulated spur in the error signal 417 and the baseband Tx signal 432, when the error signal 417 comprises the unwanted Tx-modulated spur.

In a first instance, for example, when the subtraction circuit 414a subtracts the cancellation signal 419 from the first baseband Rx signal 422a, the channel coefficient (i.e., the one or more channel coefficients associated with the one or more Tx subcarriers of the baseband Tx signal 432) at the equalizer circuit 414c will be zero, as the channel coefficient has not been determined yet. Therefore, in the first instance, the cancellation signal 419 will be essentially zero and the error signal 417 at the output of the subtraction circuit 414a will have the wanted Rx signal and the entire unwanted Tx-modulated spur associated with the first baseband Rx signal 422a. However, in a second instance, following the first instance, the estimation circuit 414b is configured to determine a channel coefficient based on the error signal 417 and the baseband Tx signal 432, and provide the estimated channel coefficient to the equalizer circuit 414c. Upon receiving the channel coefficient, the equalizer circuit 414c is configured to multiply the baseband Tx signal 432 with the channel coefficient to generate the cancellation signal 419.

In some embodiments, estimating the channel coefficient at the estimation circuit 414b and modifying the baseband Tx signal 432 based on the estimated channel coefficient at the equalizer circuit 414c is a continuous process. That is, the estimation circuit 414b is configured to determine the channel coefficient (or an estimate of the channel coefficient) based on a correlation of the unwanted TX-modulated spur in the error signal 417 and the baseband Tx signal 432, and generate the channel coefficients whenever there is a correlation. In some embodiments, a correlation is determined at the estimation circuit 414b when the unwanted TX-modulated spur is present in the error signal 417. Therefore, in the instances where the error signal 417 comprises unwanted TX-modulated spur, a corresponding channel coefficient is determined at the estimation circuit 414b and provided to the equalizer circuit 414c. In some embodiments, the channel coefficient provided to the equalizer circuit 414c updates a channel coefficient present in the equalizer circuit 414c. However, in the instances where the error signal 417 doesn't comprise the unwanted Tx-modulated spur, no correlation exists between the unwanted TX-modulated spur in the error signal 417 and the baseband Tx signal 432, and therefore, no new channel coefficients are determined at the estimation circuit 414b. In such embodiments, the equalizer circuit 414c is configured to generate the cancellation signal 419 by utilizing the channel coefficient from the earlier instance (for example, the just previous instance).

In some embodiments, the cancellation circuit 414 is configured to cancel the unwanted Tx-modulated spur in the first baseband Rx signal 422a on a subcarrier basis. In frequency domain, the first baseband Rx signal 422a can be viewed as N independent and orthogonal Rx subcarriers. Similarly, the baseband Tx signal 432 can also be viewed as N independent and orthogonal Tx subcarriers. In some embodiments, the Rx subcarriers comprises a wanted Rx portion and an unwanted Tx-modulated spur portion generated due to an interference from a corresponding Tx subcarrier. In such embodiments, a channel coefficient for modifying each Tx subcarrier associated with the baseband Tx signal 432 is independently estimated at the cancellation circuit 414 (i.e., the estimation circuit 414b) based on the frequency domain Tx data on each Tx subcarrier (associated with the baseband Tx signal 432) and the unwanted Tx-modulated spur (associated with the error signal 417) on a corresponding Rx subcarrier. In some embodiments, each of the Tx subcarrier associated with the baseband Tx signal 432 can have a corresponding Rx subcarrier on which the Tx subcarrier generates the unwanted Tx-modulated spur. In some embodiments, the Rx subcarrier corresponding to each Tx subcarrier is determined based on a modulated spur offset that is predetermined. In some embodiments, the modulated spur offset gives an indication of a position of the Tx-modulated spur corresponding to each Tx subcarrier. Upon determining the channel coefficient for each Tx subcarrier, the Tx data on each of the Tx subcarrier is multiplied with the estimated channel coefficient for the corresponding Tx subcarrier and then subtracted from the corresponding Rx subcarrier. In some embodiments, the cancellation signal 419 comprises a plurality of cancellation subcarriers, wherein each of the cancellation subcarriers is generated by modifying a Tx subcarrier with a respective channel coefficient.

In some embodiments, in frequency domain, the cancellation of the Tx-modulated spur is carried out only on the affected subcarriers. That is, based on the resource block (RB) allocation in the baseband Tx signal, the cancellation can be done only to the subcarriers where the RBs are allocated. In some instances, therefore, the frequency domain cancellation of the unwanted Tx-modulated spur is adaptable to the RB allocation. For example, if the baseband Tx signal 432 is a single RB allocated signal, only 12 subcarriers are filled with data, while the rest of the subcarriers are irrelevant or empty. Therefore, in such embodiments, it is sufficient to cancel the unwanted Tx-modulated spur on the affected 12 subcarriers associated with the baseband Rx signal 422a. In some embodiments, the frequency domain cancellation of the unwanted Tx-modulated spur provides a lower complexity alternative to time domain cancellation of the unwanted Tx-modulated spur, as in time-domain, as the unwanted Tx-modulated spur is spread over all wanted data samples, independent of the RB allocation.

In some embodiments, where the cancellation circuit 414 is further configured to cancel the unwanted Tx-modulated spur in the second baseband Rx signal 422b, the cancellation circuit 414 is further configured to determine one or more channel coefficients for modifying the one or more Tx subcarriers associated with the baseband Tx signal 432, based on a correlation between the unwanted Tx-modulated spur in the second baseband Rx signal 422b and the baseband Tx signal 432. Therefore, in such embodiments, the cancellation circuit 414 is configured to estimate one or more first channel coefficients determined based on a correlation between the unwanted Tx modulated spur in the first baseband Rx signal 422a and the baseband Tx signal 432, and provide a first cancellation signal to the first baseband Rx signal 422a, in order to cancel the unwanted Tx modulated spur from the first baseband Rx signal 422a, based on modifying the baseband Tx signal 432 in accordance with the estimated one or more first channel coefficients. Further, the cancellation circuit 414 is configured to estimate one or more second channel coefficients determined based on a correlation between the unwanted Tx modulated spur in the second baseband Rx signal 422b and the baseband Tx signal 432, and provide a second cancellation signal to the second baseband Rx signal 422b, in order to cancel the unwanted Tx modulated spur from the second baseband Rx signal 422b, based on modifying the baseband Tx signal 432 in accordance with the estimated one or more second channel coefficients.

Figure 5:
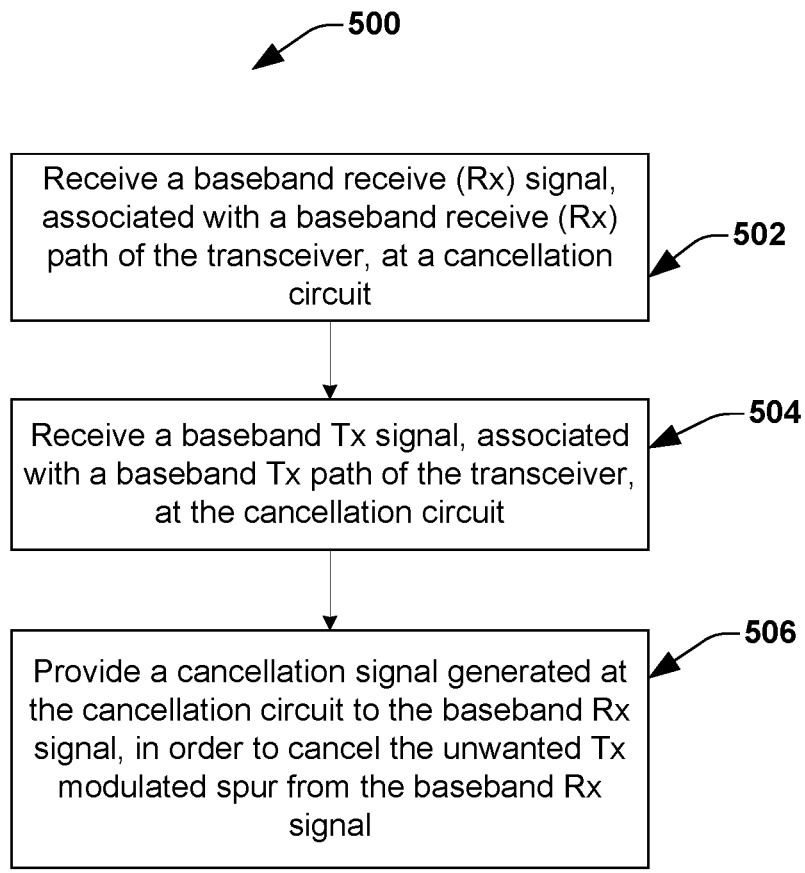
FIG. 5 depicts a flow diagram of a method associated with a baseband processor of a long-term evolution (LTE) carrier aggregation (CA) transceiver, according to one embodiment of the disclosure.

FIG. 5 depicts a flow diagram of a method 500 associated with a baseband processor of a long-term evolution (LTE) carrier aggregation (CA) transceiver, according to one embodiment of the disclosure. The method 500 is explained herein with reference to the LTE-CA transceiver 400 in FIG. 4. However, in other embodiments, the method 500 is applicable to transceivers in FIGS. 1-3. At 502, a baseband receive (Rx) signal (e.g., the first baseband Rx signal 422a in FIG. 4) associated with a baseband receive (Rx) path (e.g., the first baseband Rx path 420a) of the transceiver, is received at a cancellation circuit (e.g., the cancellation circuit 414 in FIG. 4). In some embodiments, the baseband Rx signal comprises a wanted Rx signal associated with an Rx signal path of the transceiver and an unwanted transmit (Tx) modulated spur in frequency domain. In some embodiments, the unwanted Tx modulated spur is generated based on a leakage of a Tx signal (e.g., the Tx signal 435) associated with a Tx signal path (e.g., the Tx signal path 407) of the transceiver into the Rx signal path (e.g., the Rx signal path 406).

At 504, a baseband Tx signal (e.g., the baseband Tx signal 432 in FIG. 4) associated with a baseband Tx path (e.g., the baseband Tx path 426) of the transceiver, is received at the cancellation circuit. In some embodiments, the baseband Tx signal comprises the Tx signal associated with the Tx signal path of the transceiver in frequency domain. At 506, a cancellation signal (e.g., the cancellation signal 419) generated at the cancellation circuit is provided to the baseband Rx signal, in order to cancel the unwanted Tx modulated spur from the baseband Rx signal. In some embodiments, the cancellation signal is generated at the cancellation circuit, based on the received baseband Rx signal and the baseband Tx signal. In some embodiments, the cancellation signal is generated based on an estimation of one or more channel coefficients that is determined based on a correlation between the unwanted Tx-modulated spur in the baseband Rx signal and the baseband Tx signal, and modifying the baseband Tx signal based on the estimated channel coefficients.

While the methods are illustrated, and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a baseband processor associated with a long-term evolution (LTE) transceiver, comprising a baseband receive (Rx) path configured to propagate a receive signal in frequency domain, associated with an Rx signal path of the transceiver, forming a baseband Rx signal, wherein the baseband Rx signal comprises a wanted Rx signal and an unwanted transmit (Tx) modulated spur, wherein the unwanted Tx modulated spur is generated based on a leakage of a Tx signal associated with a Tx signal path of the transceiver into the Rx signal path; a baseband Tx path configured to propagate a Tx signal in frequency domain, associated with the Tx signal path of the transceiver, thereby forming a baseband Tx signal; and a cancellation circuit coupled to the baseband Rx path, configured to receive the baseband Rx signal and the baseband Tx signal, and generate a cancellation signal to the baseband Rx signal, in order to cancel the unwanted Tx modulated spur from the baseband Rx signal, wherein the cancellation signal is generated based on the baseband Rx signal and the baseband Tx signal.

Example 2 is processor including the subject matter of claim 1, wherein the cancellation signal is generated by estimating a channel coefficient that is determined based on a correlation between the unwanted Tx modulated spur in the baseband Rx signal and the baseband Tx signal, and modifying the baseband Tx signal, in accordance with the estimated channel coefficient.

Example 3 is a processor including the subject matter of claims 1-2, including or omitting elements, further comprising a signal extraction circuit coupled to the baseband Tx path configured to extract the baseband Tx signal from the baseband Tx path and provide the baseband Tx signal to the cancellation circuit.

Example 4 is a processor including the subject matter of claims 1-3, including or omitting elements, wherein the cancellation circuit comprises a subtraction circuit configured to subtract the cancellation signal from the baseband Rx signal, thereby forming an Rx output signal.

Example 5 is a processor including the subject matter of claims 1-4, including or omitting elements, wherein the cancellation circuit further comprises an estimation circuit configured to receive an error signal comprising the Rx output signal from the subtraction circuit and the baseband Tx signal from the baseband Tx path; and estimate the channel coefficient, based on a correlation between the unwanted Tx modulated spur component in the error signal and the baseband Tx signal.

Example 6 is a processor including the subject matter of claims 1-5, including or omitting elements, wherein the cancellation circuit further comprises an equalization circuit configured to generate the cancellation signal based on modifying the baseband Tx signal, in accordance with the estimated channel coefficient.

Example 7 is a processor including the subject matter of claims 1-6, including or omitting elements, wherein the baseband Rx signal comprises a plurality of Rx subcarriers, the Rx subcarriers comprising a wanted portion associated with the wanted Rx signal and an unwanted portion associated with the unwanted Tx modulated spur, and wherein the baseband Tx signal comprises a plurality of Tx subcarriers.

Example 8 is a processor including the subject matter of claims 1-7, including or omitting elements, wherein the channel coefficient comprises a plurality of channel coefficients respectively associated with the plurality of Tx subcarriers and wherein the cancellation circuit is configured to estimate the channel coefficient for each of the Tx subcarrier of the baseband Tx signal based on a frequency domain Tx data on the Tx subcarrier and the unwanted Tx-modulated spur on a corresponding Rx subcarrier of the baseband Rx signal.

Example 9 is a processor including the subject matter of claims 1-8, including or omitting elements, wherein the cancellation signal comprises a plurality of cancellation subcarriers, wherein each of the cancellation subcarriers is generated by modifying a Tx subcarrier with a corresponding estimated channel coefficient.

Example 10 is a processor including the subject matter of claims 1-9, including or omitting elements, wherein the baseband Rx path comprises a first baseband Rx path configured to propagate a first baseband Rx signal having a first frequency associated therewith, wherein the first baseband Rx signal comprises a wanted first Rx signal and an unwanted first Tx modulated spur, and a second baseband Rx path configured to propagate a second baseband Rx signal having a second, different frequency associated therewith, wherein the second baseband Rx signal comprises a wanted second Rx signal and an unwanted second Tx modulated spur.

Example 11 is a processor including the subject matter of claims 1-10, including or omitting elements, wherein the cancellation signal comprises a first cancellation signal configured to cancel the unwanted first Tx modulated spur from the first baseband Rx signal.

Example 12 is a processor including the subject matter of claims 1-11, including or omitting elements, wherein the cancellation signal further comprises a second cancellation signal configured to cancel the unwanted second Tx modulated spur from the second baseband Rx signal.

Example 13 is a processor including the subject matter of claims 1-12, including or omitting elements, wherein the baseband Rx path comprises a plurality of baseband Rx paths, wherein each of the baseband Rx paths is configured to propagate a respective baseband Rx signal having a respective frequency associated therewith, and wherein each of the baseband Rx signal comprises a wanted Rx signal and an unwanted transmit (Tx) modulated spur.

Example 14 is a processor including the subject matter of claims 1-13, including or omitting elements, wherein the cancellation signal comprises a plurality of cancellation signals configured to cancel the unwanted Tx-modulated spur respectively associated with the baseband Rx signals in the plurality of baseband Rx paths.

Example 15 is a baseband processor associated with a carrier aggregation (CA) transceiver, comprising a first baseband receive (Rx) path configured to propagate a first receive signal in frequency domain, associated with a first Rx signal path of the transceiver, forming a first baseband Rx signal having a first frequency associated therewith, wherein the first baseband Rx signal comprises a wanted first Rx signal and an unwanted first transmit (Tx) modulated spur, wherein the unwanted first Tx modulated spur is generated based on a leakage of a Tx signal associated with a Tx signal path of the transceiver into the first Rx signal path; a second baseband receive (Rx) path configured to propagate a second receive signal in frequency domain, associated with a second Rx signal path of the transceiver, forming a second baseband Rx signal having a second, different frequency associated therewith, wherein the second baseband Rx signal comprises a wanted second Rx signal and an unwanted second Tx modulated spur, wherein the unwanted second Tx modulated spur is generated based on a leakage of the Tx signal associated with the Tx signal path of the transceiver into the second Rx signal path; a baseband Tx path configured to propagate a Tx signal in frequency domain, associated with the Tx signal path of the transceiver, thereby forming a baseband Tx signal; and a cancellation circuit configured to estimate one or more first channel coefficients determined based on a correlation between the unwanted first Tx modulated spur in the first baseband Rx signal and the baseband Tx signal, and provide a first cancellation signal to the first baseband Rx signal in order to cancel the unwanted first Tx modulated spur from the first baseband Rx signal, wherein the first cancellation signal is generated based on modifying the baseband Tx signal in accordance with the estimated one or more first channel coefficients.

Example 16 is a processor including the subject matter of claim 15, wherein the cancellation circuit is further configured to estimate one or more second channel coefficients determined based a correlation between the unwanted second Tx modulated spur in the second baseband Rx signal and the baseband Tx signal, and provide a second cancellation signal to the second baseband Rx signal in order to cancel the unwanted second Tx modulated spur from the second baseband Rx signal, wherein the second cancellation signal is generated based on modifying the baseband Tx signal in accordance with the estimated one or more second channel coefficients.

Example 17 is a processor including the subject matter of claims 15-16, including or omitting elements, wherein the cancellation circuit comprises a first cancellation circuit coupled to the first baseband Rx path and configured to generate the first cancellation signal; and a second, different cancellation circuit coupled to the second baseband Rx path and configured to generate the second cancellation signal.

Example 18 is a processor including the subject matter of claims 15-17, including or omitting elements, wherein the cancellation circuit comprises a subtraction circuit configured to subtract the first cancellation signal from the first baseband Rx signal, thereby forming a first Rx output signal; and subtract the second cancellation signal from the second baseband Rx signal, thereby forming a second Rx output signal.

Example 19 is a processor including the subject matter of claims 15-18, including or omitting elements, wherein the cancellation circuit further comprises an estimation circuit configured to receive a first error signal comprising the first Rx output signal and the baseband Tx signal, and estimate the one or more first channel coefficients based on the first error signal and the baseband Tx signal; and receive a second error signal comprising the second Rx signal and the baseband Tx signal, and estimate the one or more second channel coefficients based on the second error signal and the baseband Tx signal.

Example 20 is a processor including the subject matter of claims 15-19, including or omitting elements, wherein the cancellation circuit further comprises an equalization circuit configured to generate the first cancellation signal based on modifying the baseband Tx signal, in accordance with the estimated one or more first channel coefficients; and generate the second cancellation signal based on modifying the baseband Tx signal, in accordance with the estimated one or more second channel coefficients.

Example 21 is a method for baseband processor associated with a long term evolution (LTE) transceiver, comprising receiving at a cancellation circuit, a baseband receive (Rx) signal, associated with a baseband receive (Rx) path of the transceiver, wherein the baseband Rx signal comprises a wanted Rx signal associated with an Rx signal path of the transceiver and an unwanted transmit (Tx) modulated spur in frequency domain, wherein the unwanted Tx modulated spur is generated based on a leakage of a Tx signal associated with a Tx signal path of the transceiver into the Rx signal path; receiving at the cancellation circuit, a baseband Tx signal, associated with a baseband Tx path of the transceiver, wherein the baseband Tx signal comprises the Tx signal associated with the Tx signal path of the transceiver in frequency domain; and providing a cancellation signal generated at the cancellation circuit to the baseband Rx signal, in order to cancel the unwanted Tx modulated spur from the baseband Rx signal, wherein the cancellation signal is generated based on the received baseband Rx signal and the baseband Tx signal.

Example 22 is a method including the subject matter of claim 21, wherein providing the cancellation signal to the baseband Rx signal comprises providing the cancellation signal to a subtraction circuit associated with the cancellation circuit, wherein the subtraction circuit is configured to subtract the cancellation signal from the baseband Rx signal, in order to cancel the unwanted Tx modulated spur from the baseband Rx signal, thereby forming an Rx output signal.

Example 23 is a method including the subject matter of claims 21-22, including or omitting elements, wherein generating the cancellation signal comprises estimating one or more channel coefficients based on a correlation between the unwanted Tx modulated spur in the baseband Rx signal and the baseband Tx signal, at an estimation circuit associated with the cancellation circuit; and modifying the baseband Tx signal in accordance with the estimated one or more channel coefficients, at an equalization circuit associated with the cancellation circuit, thereby forming the cancellation signal.

Example 24 is a method including the subject matter of claims 21-23, including or omitting elements, wherein estimating the one or more channel coefficients comprises receiving at the estimation circuit, an error signal comprising the Rx output signal from the subtraction circuit and the baseband Tx signal; and estimating at the estimation circuit, the one or more channel coefficients based on a correlation between an unwanted modulated spur component in the error signal and the baseband Tx signal, in accordance with a predetermined algorithm.

Example 25 is a method including the subject matter of claims 21-24, including or omitting elements, wherein modifying the baseband Tx signal in accordance with the estimated one or more channel coefficient comprises multiplying the baseband Tx signal with the estimated one or more channel coefficients to form the cancellation signal.

Various illustrative logics, logical blocks, modules, and circuits described in connection with aspects disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A baseband processor associated with a long-term evolution (LTE) transceiver, comprising:
    a baseband receive (Rx) path configured to propagate a baseband Rx signal comprising a frequency domain version of a receive signal associated with an Rx signal path of the transceiver, wherein the baseband Rx signal comprises a wanted Rx signal and an unwanted transmit (Tx) modulated spur, wherein the unwanted Tx modulated spur is generated based on a leakage of a Tx signal associated with a Tx signal path of the transceiver into the Rx signal path;
    a baseband Tx path configured to propagate a baseband Tx signal comprising a frequency domain version of the Tx signal associated with the Tx signal path of the transceiver; and
    a cancellation circuit coupled to the baseband Rx path, configured to receive the baseband Rx signal and the baseband Tx signal, and generate a cancellation signal in order to cancel the unwanted Tx modulated spur from the baseband Rx signal, wherein the cancellation signal is generated based on modifying the baseband Tx signal, in accordance with a correlation between the unwanted Tx modulated spur in the baseband Rx signal and the baseband Tx signal.

2. The processor of claim 1, wherein the cancellation signal is generated by estimating a channel coefficient that is determined based on the correlation between the unwanted Tx modulated spur in the baseband Rx signal and the baseband Tx signal, and modifying the baseband Tx signal, in accordance with the estimated channel coefficient.

3. The processor of claim 1, further comprising a signal extraction circuit coupled to the baseband Tx path configured to extract the baseband Tx signal from the baseband Tx path and provide the baseband Tx signal to the cancellation circuit.

4. The processor of claim 2, wherein the cancellation circuit comprises a subtraction circuit configured to subtract the cancellation signal from the baseband Rx signal, thereby forming an Rx output signal.

5. The processor of claim 4, wherein the cancellation circuit further comprises an estimation circuit configured to:
    receive an error signal comprising the Rx output signal from the subtraction circuit and the baseband Tx signal from the baseband Tx path; and
    estimate the channel coefficient, based on a correlation between the unwanted Tx modulated spur component in the error signal and the baseband Tx signal.

6. The processor of claim 5, wherein the cancellation circuit further comprises an equalization circuit configured to generate the cancellation signal based on modifying the baseband Tx signal, in accordance with the estimated channel coefficient.

7. The processor of claim 2, wherein the baseband Rx signal comprises a plurality of Rx subcarriers, the Rx subcarriers comprising a wanted portion associated with the wanted Rx signal and an unwanted portion associated with the unwanted Tx modulated spur, and wherein the baseband Tx signal comprises a plurality of Tx subcarriers.

8. The processor of claim 7, wherein the channel coefficient comprises a plurality of channel coefficients respectively associated with the plurality of Tx subcarriers and wherein the cancellation circuit is configured to estimate the channel coefficient for each of the Tx subcarrier of the baseband Tx signal based on a frequency domain Tx data on the Tx subcarrier and the unwanted Tx-modulated spur on a corresponding Rx subcarrier of the baseband Rx signal.

9. The processor of claim 8, wherein the cancellation signal comprises a plurality of cancellation subcarriers, wherein each of the cancellation subcarriers is generated by modifying a Tx subcarrier with a corresponding estimated channel coefficient.

10. The processor of claim 2, wherein the baseband Rx path comprises:
    a first baseband Rx path configured to propagate a first baseband Rx signal having a first frequency associated therewith, wherein the first baseband Rx signal comprises a wanted first Rx signal and an unwanted first Tx modulated spur, and
    a second baseband Rx path configured to propagate a second baseband Rx signal having a second, different frequency associated therewith, wherein the second baseband Rx signal comprises a wanted second Rx signal and an unwanted second Tx modulated spur.

11. The processor of claim 10, wherein the cancellation signal comprises a first cancellation signal configured to cancel the unwanted first Tx modulated spur from the first baseband Rx signal.

12. The processor of claim 11, wherein the cancellation signal further comprises a second cancellation signal configured to cancel the unwanted second Tx modulated spur from the second baseband Rx signal.

13. The processor of claim 2, wherein the baseband Rx path comprises a plurality of baseband Rx paths, wherein each of the baseband Rx paths is configured to propagate a respective baseband Rx signal having a respective frequency associated therewith, and wherein each of the baseband Rx signal comprises a wanted Rx signal and an unwanted transmit (Tx) modulated spur.

14. The processor of claim 13, wherein the cancellation signal comprises a plurality of cancellation signals configured to cancel the unwanted Tx-modulated spur respectively associated with the baseband Rx signals in the plurality of baseband Rx paths.

15. A baseband processor associated with a carrier aggregation (CA) transceiver, comprising:
   a first baseband receive (Rx) path configured to propagate a first receive signal associated with a first Rx signal path of the transceiver, wherein the first baseband Rx signal comprises a first frequency associated therewith, wherein the first baseband Rx signal comprises a wanted first Rx signal and an unwanted first transmit (Tx) modulated spur, and wherein the unwanted first Tx modulated spur is generated based on a leakage of a Tx signal associated with a Tx signal path of the transceiver into the first Rx signal path;
   a second baseband receive (Rx) path configured to propagate a second baseband Rx signal comprising a frequency domain version of a second receive signal associated with a second Rx signal path of the transceiver, wherein the second baseband signal comprises a second, different frequency associated therewith, wherein the second baseband Rx signal comprises a wanted second Rx signal and an unwanted second Tx modulated spur, wherein the unwanted second Tx modulated spur is generated based on a leakage of the Tx signal associated with the Tx signal path of the transceiver into the second Rx signal path;
   a baseband Tx path configured to propagate a baseband Tx signal comprising a frequency domain version of the Tx signal associated with the Tx signal path of the transceiver; and
   a cancellation circuit configured to estimate one or more first channel coefficients determined based on a correlation between the unwanted first Tx modulated spur in the first baseband Rx signal and the baseband Tx signal, and provide a first cancellation signal in order to cancel the unwanted first Tx modulated spur from the first baseband Rx signal, wherein the first cancellation signal is generated based on modifying the baseband Tx signal in accordance with the estimated one or more first channel coefficients.

16. The processor of claim 15, wherein the cancellation circuit is further configured to estimate one or more second channel coefficients determined based a correlation between the unwanted second Tx modulated spur in the second baseband Rx signal and the baseband Tx signal, and provide a second cancellation signal to the second baseband Rx signal in order to cancel the unwanted second Tx modulated spur from the second baseband Rx signal, wherein the second cancellation signal is generated based on modifying the baseband Tx signal in accordance with the estimated one or more second channel coefficients.

17. The processor of claim 16, wherein the cancellation circuit comprises:
   a first cancellation circuit coupled to the first baseband Rx path and configured to generate the first cancellation signal; and
   a second, different cancellation circuit coupled to the second baseband Rx path and configured to generate the second cancellation signal.

18. The processor of claim 16, wherein the cancellation circuit comprises a subtraction circuit configured to:
   subtract the first cancellation signal from the first baseband Rx signal, thereby forming a first Rx output signal; and
   subtract the second cancellation signal from the second baseband Rx signal, thereby forming a second Rx output signal.

19. The processor of claim 18, wherein the cancellation circuit further comprises an estimation circuit configured to:
   receive a first error signal comprising the first Rx output signal and the baseband Tx signal, and estimate the one or more first channel coefficients based on the first error signal and the baseband Tx signal; and
   receive a second error signal comprising the second Rx signal and the baseband Tx signal, and estimate the one or more second channel coefficients based on the second error signal and the baseband Tx signal.

20. The processor of claim 19, wherein the cancellation circuit further comprises an equalization circuit configured to:
   generate the first cancellation signal based on modifying the baseband Tx signal, in accordance with the estimated one or more first channel coefficients; and
   generate the second cancellation signal based on modifying the baseband Tx signal, in accordance with the estimated one or more second channel coefficients.

21. A method for baseband processor associated with a long term evolution (LTE) transceiver, comprising:
   receiving at a cancellation circuit, a baseband receive (Rx) signal associated with a baseband receive (Rx) path of the transceiver, wherein the baseband Rx signal comprises a frequency domain version of a receive signal associated with an Rx signal path of the transceiver, wherein the baseband Rx signal comprises a wanted Rx signal and an unwanted transmit (Tx) modulated spur, wherein the unwanted Tx modulated spur is generated based on a leakage of a Tx signal associated with a Tx signal path of the transceiver into the Rx signal path;
   receiving at the cancellation circuit, a baseband Tx signal associated with a baseband Tx path of the transceiver, wherein the baseband Tx signal comprises a frequency domain version of the Tx signal associated with the Tx signal path of the transceiver; and
   providing a cancellation signal generated at the cancellation circuit in order to cancel the unwanted Tx modulated spur from the baseband Rx signal, wherein the cancellation signal is generated based on modifying the baseband Tx signal, in accordance with a correlation between the unwanted Tx modulated spur in the baseband Rx signal and the baseband Tx signal.

22. The method of claim 20, wherein providing the cancellation signal to the baseband Rx signal comprises providing the cancellation signal to a subtraction circuit associated with the cancellation circuit, wherein the subtraction circuit is configured to subtract the cancellation signal from the baseband Rx signal, in order to cancel the unwanted Tx modulated spur from the baseband Rx signal, thereby forming an Rx output signal.

23. The method of claim 21, wherein generating the cancellation signal comprises:
   estimating one or more channel coefficients based on the correlation between the unwanted Tx modulated spur in the baseband Rx signal and the baseband Tx signal, at an estimation circuit associated with the cancellation circuit; and modifying the baseband Tx signal in accordance with the estimated one or more channel coefficients, at an equalization circuit associated with the cancellation circuit, thereby forming the cancellation signal.

24. The method of claim 23, wherein estimating the one or more channel coefficients comprises:

receiving at the estimation circuit, an error signal comprising the Rx output signal from the subtraction circuit and the baseband Tx signal; and estimating at the estimation circuit, the one or more channel coefficients based on a correlation between an unwanted modulated spur component in the error signal and the baseband Tx signal, in accordance with a predetermined algorithm.

25. The method of claim 23, wherein modifying the baseband Tx signal in accordance with the estimated one or more channel coefficient comprises multiplying the baseband Tx signal with the estimated one or more channel coefficients to form the cancellation signal.

* * * * *